3 Sheets—Sheet 1.

W. ADAIR.

PUMP.

No. 6,964. Reissued Feb. 29, 1876.

WITNESSES:

H. Newell

James A. Hunter

INVENTOR:

William Adair

BY

A. J. Todd his ATTORNEY.

N. PETERS, PHOTO-LITHOGRAPHER, WASHINGTON, D. C.

3 Sheets—Sheet 2.

W. ADAIR.

PUMP.

No. 6,964. Reissued Feb. 29, 1876.

WITNESSES:

R. Newell

James H. Hunter

INVENTOR:

William Adair

BY

A. J. Todd his ATTORNEY.

N. PETERS, PHOTO-LITHOGRAPHER, WASHINGTON, D. C.

3 Sheets—Sheet 3.

W. ADAIR.

PUMP.

No. 6,964. Reissued Feb. 29, 1876.

Witnesses:
K Newell
James A. Hunter

Inventor:
William Adair
By F. J. Todd
his attorney

N. PETERS, PHOTO-LITHOGRAPHER, WASHINGTON, D. C.

UNITED STATES PATENT OFFICE.

WILLIAM ADAIR, OF LIVERPOOL, ENGLAND.

IMPROVEMENT IN PUMPS.

Specification forming part of Letters Patent No. 78,854, dated June 16, 1868; antedated April 5, 1867; reissue No. 6,028, dated August 25, 1874; reissue No. 6,964, dated February 29, 1876; application filed February 24, 1876.

*To all whom it may concern:*

Be it known that I, WILLIAM ADAIR, of Liverpool, England, have invented certain new and useful Improvements in Pumps; and I do hereby declare that the following is a full, clear, and exact description thereof, reference being had to the accompanying drawing forming a part of this specification.

My invention consists in improvements in double-acting pumps: First, in combining the piston-cylinder and the chamber that contains the valves by which the water is supplied to and discharged from the lower side of the piston with an open water-head, so that the said valves and the piston, or either of them, may be readily withdrawn from the pump through said water-head; second, in combining the piston-cylinder, the said valve-chamber and its valves, and the said water-head, with a cylinder-cover, such cylinder-cover being removable from the cylinder through the open water-head; third, in combining with the valve-chamber containing valves by which the water is supplied to and discharged from the lower side of the piston-cylinder, and an open water-head, a piston-cylinder provided with a cylinder-cover acting as a discharge-valve into such open water-head from the upper side of the piston-cylinder on the upper stroke of the piston; fourth, in an improved combination and arrangement of the said valve-chamber, the piston-cylinder, and water-head, by reason of which the pump may be conveniently cast in one piece; fifth, in so combining and arranging the parts that both sets of valves in the pump can be reached with facility in order to be cleaned or freed from obstructions—that is, the valves by which the water is supplied to and discharged from the piston-cylinder on the up and down strokes of the piston.

Figure 1:
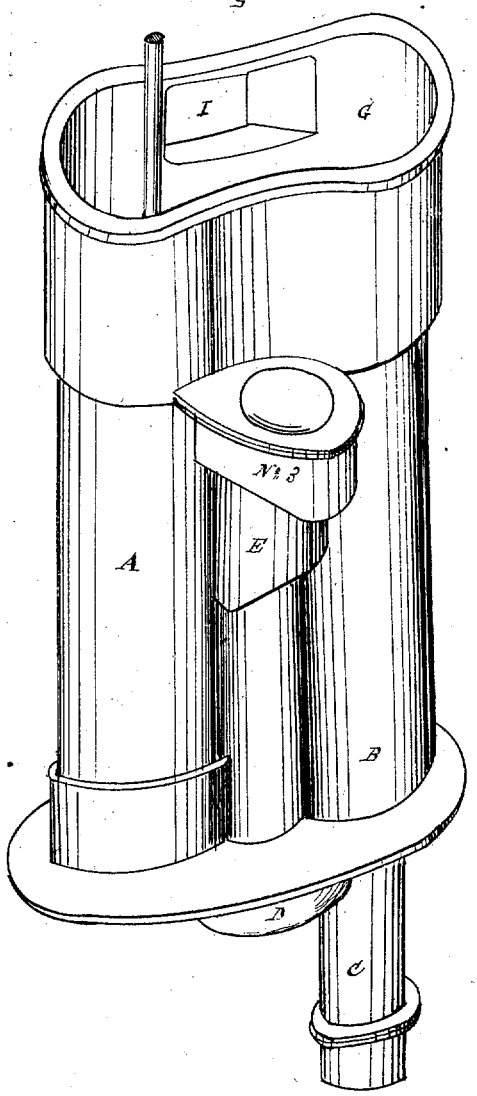
Figure 2:
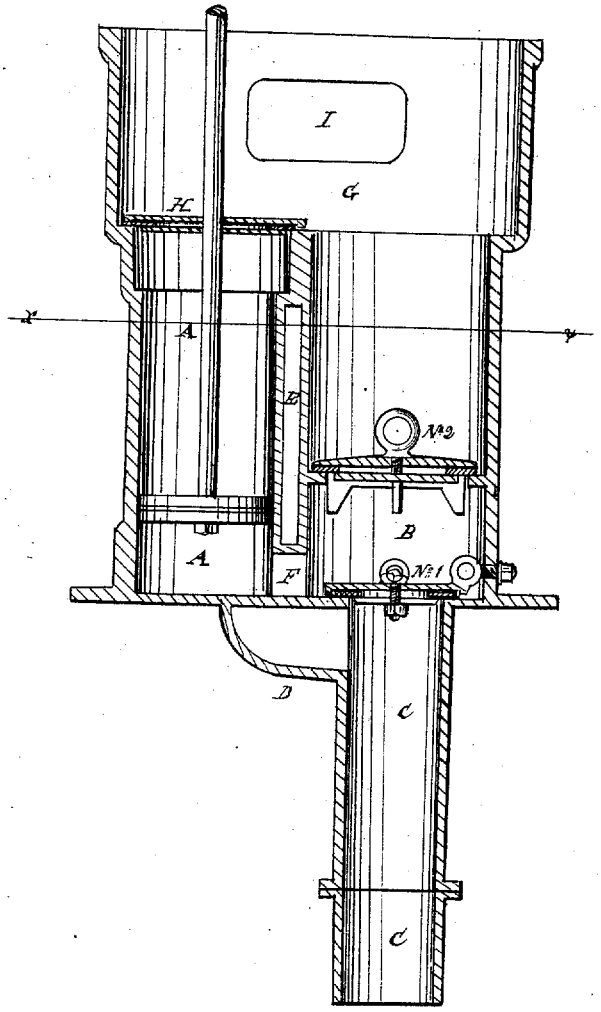
Figure 3:
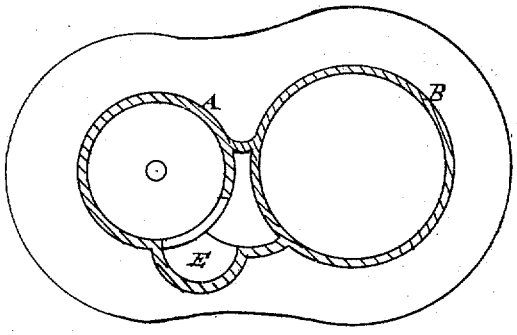

In the drawing which serves to illustrate my improvements, Figure 1 is a perspective view of the pump containing them. Fig. 2 is a vertical central section of said pump; and Fig. 3 is a horizontal section of the same taken through the line *y y* of Fig. 2.

In such pump, A is the piston-cylinder containing the piston and piston-rod. This cylinder also acts as one of the discharging-chambers of the pump on the upstroke of the piston. B is the other discharging-chamber. C is the feed or suction pipe. D is the branch of the feed-pipe at the bottom of the chamber B. E is the branch from the same to the top of the cylinder A, and F is the port or communication between the cylinder A and chamber B.

In this pump there are three ordinary valves, No. 1 opening from the feed-pipe up and into the bottom of the chamber B. No. 2 is placed in and across the chamber B, a short distance above No. 1. This valve-chamber, made sufficiently large to admit of the withdrawal through it of the valves Nos. 1 and 2, opens upward, allowing the water to pass off through a water-head or chamber, G. This water-head is open all across its top, and is also made sufficiently large to admit of the withdrawal through it of the valves Nos. 1 and 2, the piston-rod, and the cylinder-cover. By reason of such arrangement of the said valve-chamber, piston-cylinder, and open water-head, passage is left to the valves Nos. 1 and 2, and to the piston, to readily withdraw them or the cylinder-cover, or either of them, from the pump-casing, if it is necessary to do so for the removal of obstructions, or for the purpose of repairs, &c. The third valve is situated in and across the upper branch of the feed-pipe, and just before its entry into the cylinder A. The box of this valve is marked No. 3. All of these valves are reached with facility and ease in case it is necessary to remove obstructions therefrom or to clean them.

In addition to these valves there is the port F at the lower portions of and connecting the cylinder A and chamber B, but closed to the feed-pipe, and situated between valves Nos. 1 and 2. During the upper stroke the piston raises the water which is above it in the cylinder A, and previously admitted through the valve No. 3, but now closed, slightly elevating the cover H, which, on the upward stroke of the piston, constitutes a fourth valve, discharges such water into the water-head or chamber G; from thence the water passes out through the nozzle I. At the same time the water in the feed-pipe C opens valve No. 1, valve No. 2 remaining closed, and pours through the port or passage F into the cylinder A under the piston, to be ready for the downward stroke. During the downward stroke the piston forces the water now collected below it through the passage F, closing valve No. 1 and opening valve No. 2, up through the cylinder B, and discharging it directly into the open water-head or chamber G, and from thence it passes out through the nozzle I. During the downward passage of the piston the water in the feed-pipe C, valve No. 1 being closed, is drawn up through the branches D and E, raising valve No. 3, and filling the space above the piston, and between it and the cylinder-cover H, to be ready to be discharged into the water-head or chamber G, and thence out through the nozzle I, in manner as before stated, on the upstroke of the piston.

The arrangement of the chamber containing the valves Nos. 1 and 2 of the pump, the piston-cylinder, and the open water-head in this pump enables such parts to be conveniently cast in one piece. Another advantage of my said arrangement is that there will always be a packing of water on the upper side of the piston-cylinder to protect the vacuum formed in such cylinder on the upper side of the piston on the downward stroke of the piston, and hence avoid the necessity of a stuffing-box to the piston-rod.

I claim—

1. The combination of the piston-cylinder and the valve-chamber that contains the valves by which the water is supplied to and discharged from the lower side of the piston with an open water-head, so that said valves and the piston, or either of them, may be readily withdrawn, substantially as described.

2. The combination of the piston-cylinder, the valve-chamber and its valves, by which the water is supplied to and discharged from the lower side of the piston, the water-head and a cylinder-cover, which is removable from the pump through the open water-head, substantially as described.

3. The combination of the valve-chamber and its valves, by which the water is supplied to and discharged from the lower side of the piston, with the open water-head, and a piston-cylinder, provided with a cover, acting as a discharge-valve, substantially as described 4. The combination of the valve-chamber. piston-cylinder, and open water-head, sub, stantially as described.

5. The combination of an open water-head and piston-cylinder with the valves, by which the water is supplied to and discharged from the piston-cylinder on both the up and down strokes of the piston, substantially as described.

WM. ADAIR.

Witnesses:
JAMES W. BUSBY,
JAMES JOHNSON.